United States Patent
Lee et al.

(10) Patent No.: US 11,901,125 B2
(45) Date of Patent: Feb. 13, 2024

(54) CAPACITOR COMPONENT INCLUDING UNIT DEVICE HAVING POLYGONAL-SHAPED CROSS-SECTION

(71) Applicant: SAMSUNG ELECTRO-MECHANICS CO., LTD., Suwon-si (KR)

(72) Inventors: Sang Jong Lee, Suwon-si (KR); Han Kim, Suwon-si (KR); Min Cheol Park, Suwon-si (KR); Su Bong Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/884,759

(22) Filed: Aug. 10, 2022

(65) Prior Publication Data

US 2023/0343515 A1  Oct. 26, 2023

(30) Foreign Application Priority Data

Apr. 26, 2022 (KR) .................. 10-2022-0051251

(51) Int. Cl.
*H01G 4/248* (2006.01)
*H01G 4/01* (2006.01)
*H01G 4/008* (2006.01)

(52) U.S. Cl.
CPC .............. *H01G 4/01* (2013.01); *H01G 4/008* (2013.01); *H01G 4/248* (2013.01)

(58) Field of Classification Search
CPC .......... H01G 4/30; H01G 4/248; H01G 4/008; H01G 4/01
See application file for complete search history.

(56) References Cited

U.S. PATENT DOCUMENTS

| | | | | |
|---|---|---|---|---|
| 3,246,215 A | * | 4/1966 | Rieth ................ | H01G 4/12 29/829 |
| 5,168,421 A | * | 12/1992 | Suzuki .............. | H01G 2/12 29/25.42 |
| 2009/0021886 A1 | | 1/2009 | Masuda | |
| 2012/0217615 A1 | * | 8/2012 | Tatekawa ......... | H01G 4/129 257/532 |

(Continued)

FOREIGN PATENT DOCUMENTS

| | | | | |
|---|---|---|---|---|
| GB | 2502904 A | * | 12/2013 | ........ H01G 11/10 |
| JP | 10340826 A | * | 12/1998 | ........ H01G 11/10 |

(Continued)

*Primary Examiner* — David M Sinclair
(74) *Attorney, Agent, or Firm* — MORGAN, LEWIS & BOCKIUS LLP

(57) ABSTRACT

A capacitor component includes a body including a capacitance formation portion including a plurality of unit devices including a first internal electrode, a first dielectric film surrounding the first internal electrode, and a second internal electrode surrounding the first dielectric film, and a molded portion surrounding the capacitance formation portion, first and second external electrodes respectively disposed on a first surface and a second surface of the body opposing each other in a first direction to be respectively connected to the first and second internal electrodes. Cross-sections perpendicular to the first direction of at least two of the plurality of unit devices have a polygonal shape.

20 Claims, 11 Drawing Sheets

(56) References Cited

U.S. PATENT DOCUMENTS

2014/0016068 A1    6/2014  Doyle et al.
2018/0315550 A1*  11/2018  Ryou .................. H01G 4/33
2019/0100465 A1    4/2019  Yoon et al.

FOREIGN PATENT DOCUMENTS

| JP | 4835876 B2 | 12/2011 |
| JP | 2016-501440 A | 1/2016 |
| JP | 2019-096674 A | 6/2019 |
| KR | 10-2001-0013579 A | 2/2001 |
| KR | 10-1738060 B1 | 5/2017 |
| KR | 10-1933420 B1 | 12/2018 |
| WO | 1998/057341 A1 | 12/1998 |
| WO | 2014/092785 A1 | 6/2014 |

\* cited by examiner

CAPACITOR COMPONENT INCLUDING UNIT DEVICE HAVING POLYGONAL-SHAPED CROSS-SECTION

CROSS-REFERENCE TO RELATED APPLICATION(S)

This application claims the benefit of priority to Korean Patent Application No. 10-2022-0051251 filed on Apr. 26, 2022 in the Korean Intellectual Property Office, the disclosure of which is incorporated herein by reference in its entirety.

TECHNICAL FIELD

The present disclosure relates to a capacitor component.

BACKGROUND

With technological development, demand for electronic components in the form of a chip having a small volume and high capacitance has increased. Accordingly, with the recent miniaturization and implementation of high-functionality in IT products, capacitors used in the IT products have also been required to be miniaturized and to have high capacitance.

In line with such a trend, multilayer capacitors have been developed in a direction of increasing thinning of a dielectric layer and an internal electrode while developing a dielectric material with a high dielectric constant.

However, multilayer capacitors are currently approaching a limit of capacitance per unit volume due to a decrease in breakdown voltage (BDV) caused by thinning, and a structural capacitance limitation of a surface stacking process.

In order to address the issues described above, various types of capacitors have been developed. For example, a wire-type capacitor has been developed. The wire-type capacitor has a form in which a dielectric material and a metal are alternately coated on a metal wire, thereby achieving a high-capacitance capacitor.

However, when a plurality of capacitors having a circular cross-section according to the related art are arranged, a space is generated between adjacent wire capacitors, and thus a packing density is lowered. Accordingly, there is a limit to capacitance per unit volume.

Related Art 1: Korean Patent Publication No. 10-1933420
Related Art 2: Korean Patent Publication No. 10-1738060

SUMMARY

An aspect of the present disclosure is to provide a capacitor component including a plurality of unit devices having a polygonal cross-section, thereby being advantageous for miniaturization and the implementation of high capacitance.

However, aspects of the present disclosure are not limited to the above, and will be more easily understood in the course of describing specific example embodiments of the present disclosure.

An aspect of the present disclosure is to provide a capacitor component including a body including a capacitance formation portion including a plurality of unit devices including a first internal electrode, a first dielectric film surrounding the first internal electrode, and a second internal electrode surrounding the first dielectric film, and a molded portion surrounding the capacitance formation portion, first and second external electrodes respectively disposed on a first surface and a second surface of the body opposing each other in a first direction to be respectively connected to the first and second internal electrodes. Cross-sections perpendicular to the first direction of at least two of the plurality of unit devices have a polygonal shape.

As one of various effects of the present disclosure, a capacitor component may include a plurality of unit devices having a polygonal cross-section, thereby being advantageous for miniaturization and the implementation of high capacitance.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
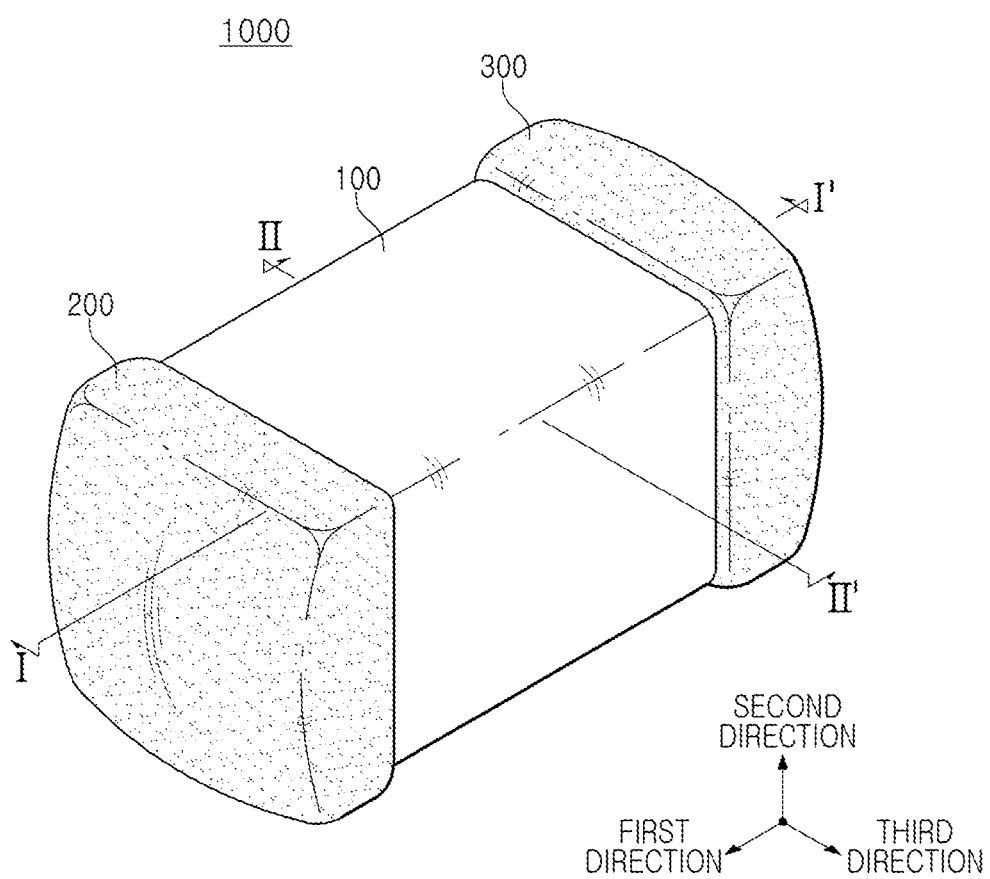
FIG. 1 is a perspective view schematically illustrating a capacitor component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a length (L) direction, a second direction may be defined as a thickness (T) direction, and a third direction may be defined as a width (W) direction.

FIG. 1 is a perspective view schematically illustrating a capacitor component according to an example embodiment of the present disclosure.

Figure 2:
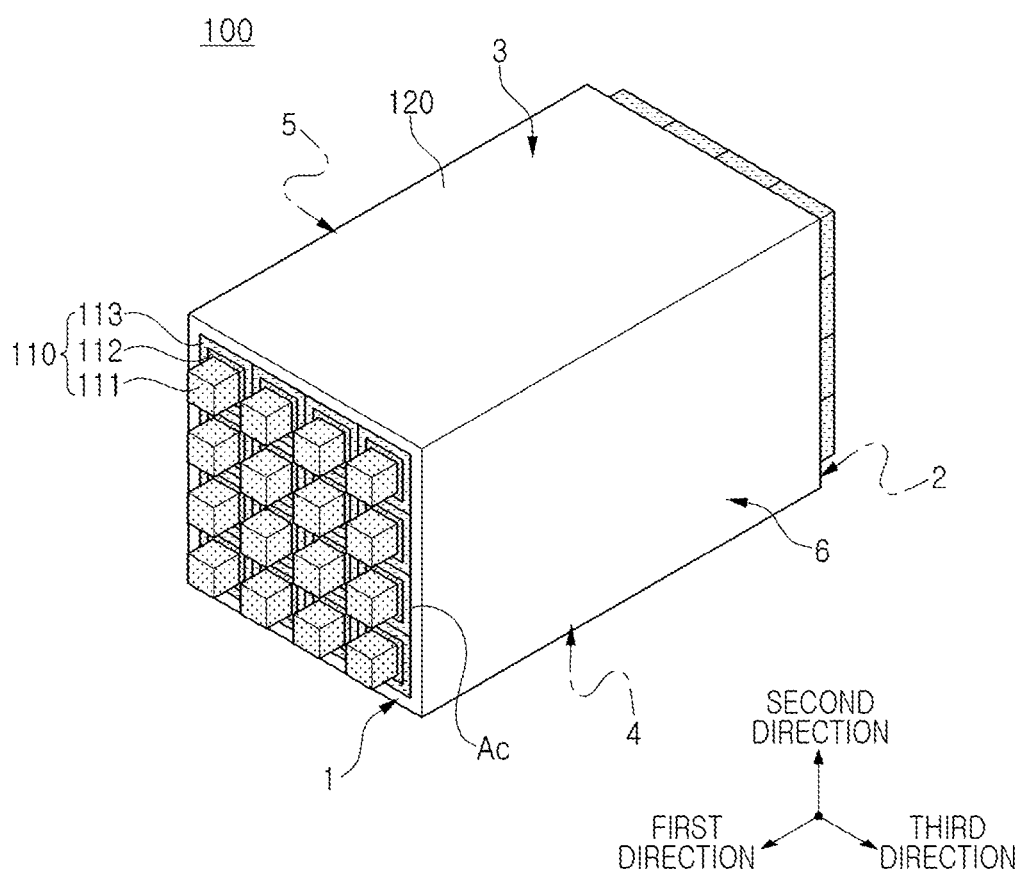
FIG. 2 is a perspective view schematically illustrating a body of a capacitor component.

FIG. 2 is a perspective view schematically illustrating a body of a capacitor component.

Figure 3:
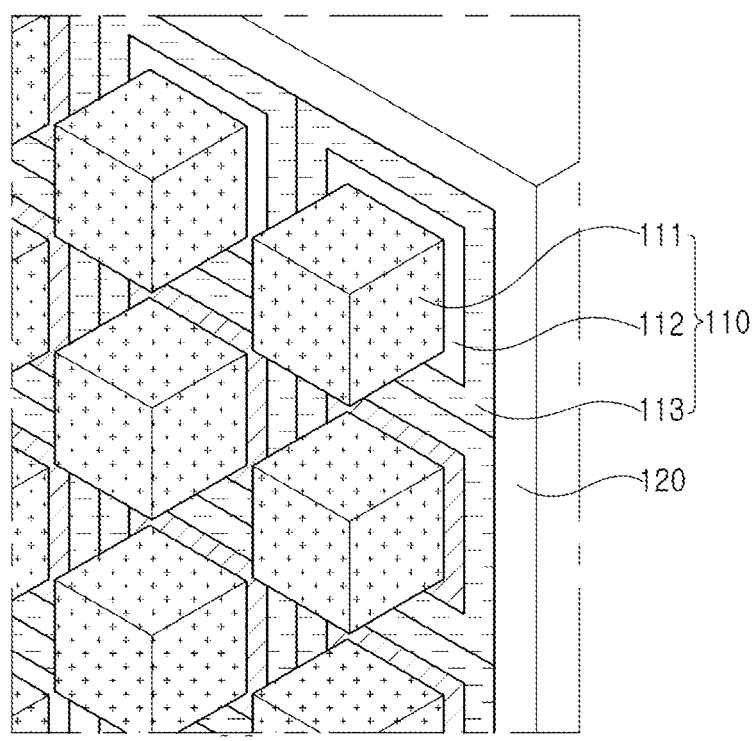
FIG. 3 is an enlarged perspective view of a unit device exposed on a first surface of a body.

FIG. 3 is an enlarged perspective view of a unit device exposed on a first surface of a body.

Figure 4:
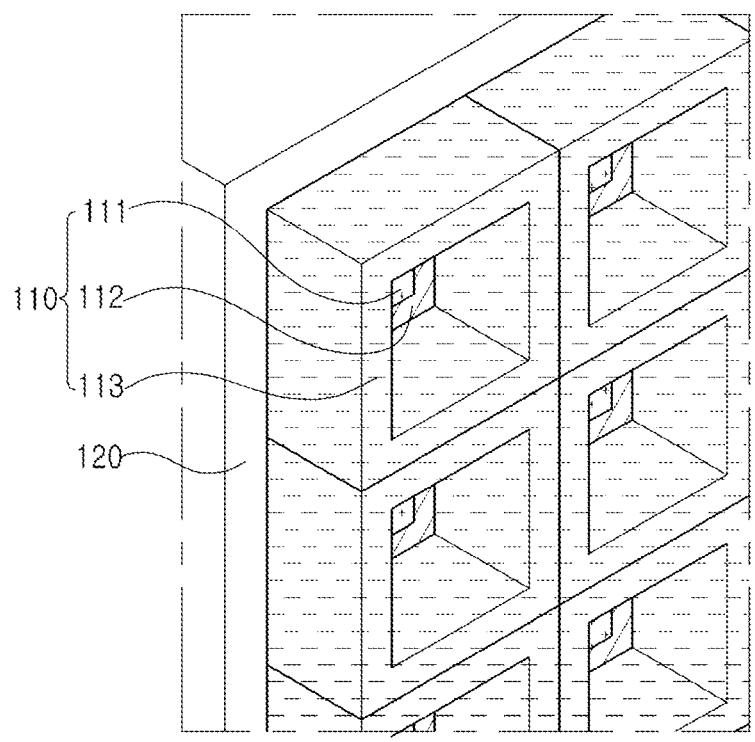
FIG. 4 is an enlarged perspective view of a unit device exposed on a second surface of a body.

FIG. 4 is an enlarged perspective view of a unit device exposed on a second surface of a body.

Figure 5:
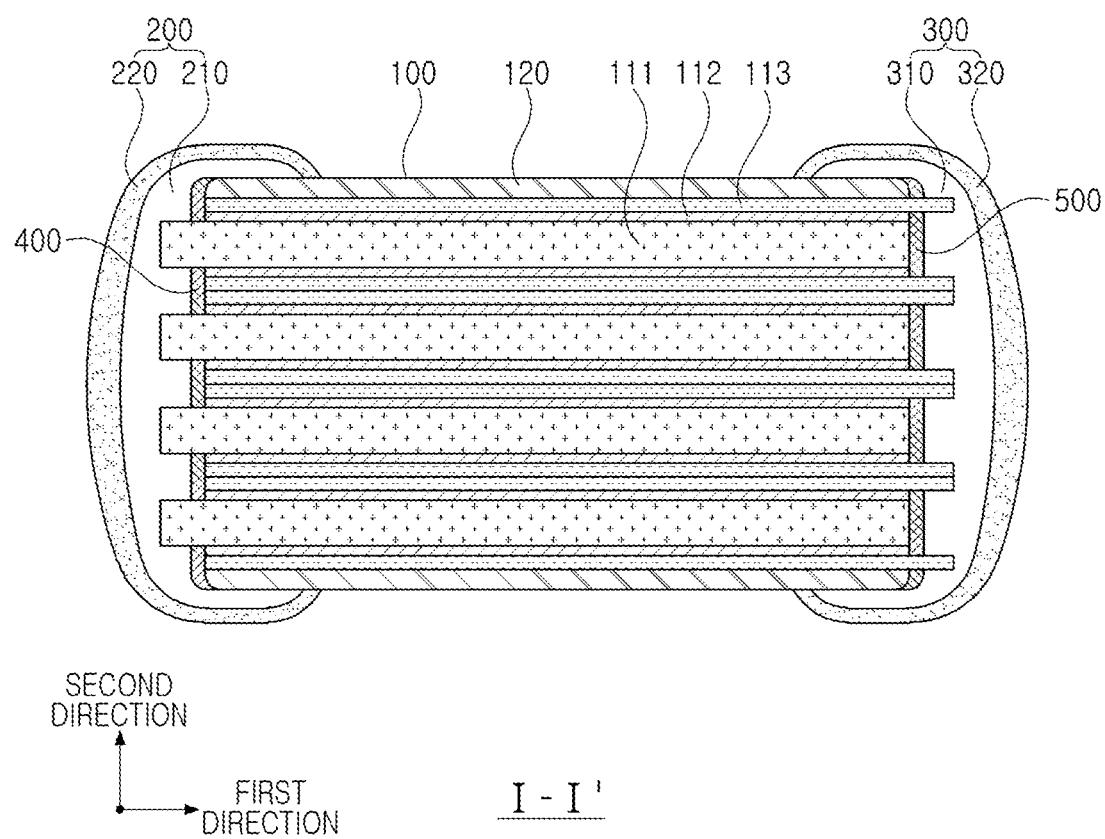
FIG. 5 is a cross-sectional view taken along line I-I' of FIG. 1.

FIG. 5 is a cross-sectional view taken along line I-I' of FIG. 1.

Figure 6:
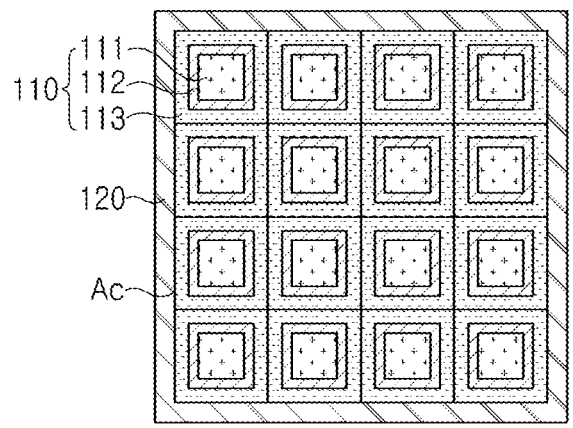
FIG. 6 is a cross-sectional view taken along line II-II' of FIG. 1.

FIG. 6 is a cross-sectional view taken along line II-II' of FIG. 1.

Referring to FIGS. 1 to 6, a capacitor component 1000 according to an example embodiment of the present disclosure may include a body 100 including a capacitance formation portion Ac including a plurality of unit devices 110 including a first internal electrode 111, a first dielectric film 112 surrounding the first internal electrode 111, and a second internal electrode 113 surrounding the first dielectric film 112, and a molded portion 120 surrounding the capacitance formation portion Ac, and first and second external electrodes 200 and 300 respectively disposed on first and second surfaces 1 and 2 of the body 100 opposing each other in a first direction to be respectively connected to the first and second internal electrodes 111 and 113. Cross-sections perpendicular to the first direction of at least two of the plurality of unit devices 110 may have a polygonal shape.

As described above, when a plurality of unit devices having a circular cross-section are arranged, a space may be generated between adjacent unit devices, and thus a packing density may be lowered. Accordingly, there may be a limit to capacitance per unit volume.

Conversely, the capacitor component 1000 according to an example embodiment of the present disclosure may include at least two unit devices 110 having a polygonal cross-section perpendicular to the first direction, and thus a packing density of the unit devices 110 disposed in the body 100 may be increased, thereby maximizing capacitance per unit volume.

Hereinafter, respective elements included in the capacitor component 1000 according to an example embodiment of the present disclosure are described in more detail.

The body 100 may include the capacitance formation portion Ac including the plurality of unit devices 110, and the molded portion 120 surrounding the capacitance formation portion Ac. A specific shape of the body 100 is not particularly limited. However, as illustrated, the body 100 may have a hexahedral shape or a shape similar thereto.

The body 100 may have first and second surfaces 1 and 2 opposing each other in the first direction, third and fourth surfaces 3 and 4 respectively connected to the first and second surfaces 1 and 2 and opposing each other in a second direction, and fifth and sixth surfaces 5 and 6 respectively connected to the first to fourth surfaces 1, 2, 3, and 4, and opposing each other in a third direction.

The unit devices 110 may include, for example, the first internal electrode 111, the first dielectric film 112 surrounding the first internal electrode 111, and the second internal electrode 113 surrounding the first dielectric film 112.

Each of a plurality of first internal electrodes 111 may extend in the first direction, and may be connected to the first external electrode 200 on the first surface 1 of the body 100. As described below, a plurality of second internal electrodes 113 may be connected to the second external electrode 300 on the second surface 2 of the body 100. That is, the first and second internal electrodes 111 and 113 may function as a pair of electrodes having different polarities.

The plurality of first internal electrodes 111 may have the same material or different materials from each other. For example, all of the plurality of first internal electrodes 111 may be made of copper (Cu). For example, some of the plurality of first internal electrodes 111 may be made of copper (Cu), and the others of the plurality of first internal electrodes 111 may be made of nickel (Ni).

The plurality of first internal electrodes 111 may have a polygonal column shape. Accordingly, cross-sections perpendicular to the first direction of the plurality of first internal electrodes 111 may have a polygonal shape.

For example, the plurality of first internal electrodes 111 may have a triangular column shape, a quadrangular column shape, a pentagonal column shape, or a hexagonal column shape. All of the plurality of first internal electrodes 111 may be a quadrangular column or a triangular column. Accordingly, cross-sections perpendicular to the first direction of all of the plurality of first internal electrodes 111 may have a quadrangular or triangular shape, but the present disclosure is not limited thereto.

The plurality of first internal electrodes 111 may be manufactured by, for example, a draw process, but the present disclosure is not limited thereto. If it is possible to manufacture the first internal electrode 111 to have a polygonal column shape, the first internal electrode 111 may be formed by any manufacturing process.

An average dimension of the first internal electrode 111 may not need to be particularly limited. For example, an average size of the first internal electrode 111 in the second direction and an average size of the first internal electrode 111 in the third direction may be 10 μm or less, respectively, and may be 2 μm or less, respectively, and more preferably 0.5 μm or less, respectively, in consideration of miniaturization and high capacitance of the capacitor component 1000.

An average size of the first internal electrode 111 in the second direction and an average size of the first internal electrode 111 in the third direction may respectively refer to sizes obtained by respectively performing a plurality of measurements, based on an optical microscope image or a scanning electron microscope (SEM) image for cross-sections in the second and third directions taken from a central portion of the capacitor component 1000 in the first direction, on one first internal electrode 111 illustrated in the image in the second direction and the third direction, and respectively calculating arithmetic averages of the measurements. Here, the plurality of measurements performed in the second direction and the third direction may be equally spaced apart from each other in the second direction and the third direction, respectively, but are not limited thereto. Alternatively, the average sizes may respectively refer to sizes obtained by respectively measuring sizes in the second direction and the third direction of at least three first internal electrodes 111 illustrated in the image through the above-described process, and respectively calculating arithmetic averages of the sizes.

The first dielectric film 112 may be disposed to surround the first internal electrode 111. More specifically, the first dielectric film 112 may be disposed between the first internal electrode 111 and the second internal electrodes 113 to cover side surfaces (cross-sections opposing each other in the second direction and the third direction) of the first internal electrode 111. That is, the first dielectric film 112 may serve as a separator to prevent an electrical short-circuit between the first internal electrodes 111 and the second internal electrodes 113.

A material of the first dielectric film 112 may not need to be particularly limited. For example, the first dielectric film 112 may include at least one oxide selected from tantalum (Ta), titanium (Ti), lanthanum (La), zirconium (Zr), barium (Ba), silicon (Si), aluminum (Al), and hafnium (Hf).

The first dielectric film 112 may be formed by, for example, a vapor deposition process such as atomic layer deposition (ALD) process or chemical vapor deposition (CVD) process, but the present disclosure is limited thereto.

The second internal electrodes 113 may be connected to the second external electrode 300 on the second surface 2 of the body 100, and may be disposed to surround the first dielectric film 112. More specifically, the second internal electrode 113 may be disposed to cover side surfaces (cross-sections opposing each other in the second direction and the third direction) of the first dielectric film 112.

The first dielectric film 112 may be disposed between the first internal electrodes 111 and the second internal electrodes 113, and thus charges with different polarities may be applied to the first internal electrodes 111 and second internal electrodes 113 to form a capacitance in the first dielectric film 112.

Cross-sections perpendicular to the first direction of the second internal electrodes 113 may have a polygonal ring shape. For example, when a cross-section perpendicular to the first direction of the first internal electrode 111 has a quadrangular shape, a cross-section perpendicular to the first direction of the second internal electrode 113 may have a quadrangular ring shape.

In other words, the unit devices 110 have a core-clad structure, wherein the first internal electrode 111 forms a core while the first dielectric film 112 forms a first clad surrounding the core and the second internal electrode 113 forms a second clad surrounding the first clad.

The second internal electrode 113 may be formed by a thin film process such as a vapor deposition process, a plating process, or the like, for example, by an ALD process, but the present disclosure is not limited thereto.

Average thicknesses of the first dielectric film 112 and the second internal electrode 113 may not need to be particularly limited. For example, the average thicknesses of the first dielectric film 112 and the second internal electrode 113 may be 0.5 µm or less, preferably 0.1 µm or less, and more preferably 0.05 µm or less, in consideration of miniaturization and high capacitance of the capacitor component 1000.

The average thicknesses of the first dielectric film 112 and the second internal electrode 113 may respectively refer to thicknesses obtained by respectively performing a plurality of measurements, based on an optical microscope image or an SEM image for cross-sections in the second and third directions taken from the central portion of the capacitor component 1000 in the first direction, one first dielectric film 112 and one second internal electrode 113 illustrated in the image along a direction perpendicular to the first direction, and respectively calculating arithmetic averages of the measurements. Alternatively, the average thicknesses may respectively refer to thicknesses obtained by respectively measuring average thicknesses of at least three first dielectric films 112 and second internal electrodes 113 illustrated in the image through the above-described process, and respectively calculating arithmetic averages of the average thicknesses.

The plurality of unit devices 110 may extend in the first direction, and may be arranged in a second direction and/or a third direction perpendicular to the first direction. That is, the plurality of unit devices 110 may be arranged in the form of an array in the second direction and/or the third direction.

Cross-sections perpendicular to the first direction of at least two of the plurality of unit devices 110 may have a polygonal shape, for example, may have a quadrangular shape as illustrated in FIGS. 1 to 6. In addition, cross-sections perpendicular to the first direction of the unit devices 110 may have various quadrangular shapes, such as a rectangular shape or a square shape, but the present disclosure is not limited thereto, and the polygonal shape may be, for example, a triangular shape, a pentagonal shape, or a hexagonal shape.

When the cross-sections perpendicular to the first direction of the unit devices 110 have a rectangular shape, capacitance per unit volume may be improved by increasing a packing density of the unit devices 110 disposed in the body 100. In addition, as described below, when the unit devices 110 have the same diameter, areas of cross-sections in the second direction and the third direction of the unit devices 110 may be greater than those of circular cross-sections of the unit device 110, and thus may have a reduced equivalent series resistance (ESR) compared to those of the circular cross-sections of the unit devices 110.

The cross-sections perpendicular to the first direction of at least two unit devices 110 may have the same polygonal shape or different polygonal shapes. For example, cross-sections perpendicular to the first direction of two unit devices 110 may have a quadrangular shape or a triangular shape, respectively. In addition, one of the two unit devices 110 may have a quadrangular cross-section perpendicular to the first direction, and the other may have a triangular cross-section.

However, the present disclosure is not limited thereto, and it may be sufficient if it is possible to improve the capacitance per unit volume by increasing the packing density of the unit devices 110 disposed in the body 100, and shapes of the cross-sections perpendicular to the first direction of the unit devices 110 is not particularly limited. For example, one of the two unit devices 110 may have a heptagonal cross-section perpendicular to the first direction, and the other may have a pentagonal shape. In addition, one of the two unit devices 110 may have an octagonal cross-section perpendicular to the first direction, and the other may have a quadrangular cross-section.

When an overall shape of the body 100 is a substantially rectangular parallelepiped, the cross-sections perpendicular to the first direction of the unit devices 110 may preferably have a rectangular shape or a triangular shape, but the present disclosure is not limited thereto. Details of a unit device having a triangular cross-section are described below.

Cross-sections perpendicular to the first direction of the plurality of unit devices 110 have a polygonal shape, and thus at least two unit devices 110 may be disposed to be in surface contact with each other. The two unit devices 110 disposed to be in surface contact with each other may mean that one surface of one unit device 110 is in contact with one surface of the other unit device 110.

In addition, in a cross-section perpendicular to the first direction, one side of at least one unit device 110 may be disposed to face one side of another unit device 110 in contact therewith.

Accordingly, the plurality of unit devices 110 may be packed without a space between adjacent unit devices 110, and thus the packing density of the unit devices 110 disposed in the body 100 may be increased, thereby improving capacitance per unit volume of a capacitor component.

More preferably, unit devices adjacent to each other among the plurality of unit devices 110 may be disposed to be in surface contact with each other in the second and third directions. The unit devices adjacent to each other among the plurality of unit devices 110 disposed to be in surface contact with each other in the second and third directions means that side surfaces (cross-sections opposing each other in the second direction and the third direction) of each of the plurality of unit devices 110 excluding the unit devices 110 disposed outside the capacitance formation portion Ac connected to the molded portion 120 are in contact with one surface of another unit device 110.

In addition, in a cross-section perpendicular to the first direction, one sides of the plurality of unit devices 110 may be disposed to face one side of another adjacent unit device 110 in contact therewith.

Accordingly, the packing density of the unit devices 110 disposed in the body 100 may be further increased, thereby significantly improving capacitance per unit volume of the capacitor component. In addition, there is no need to fill a space between the adjacent unit devices 110 with the molded portion 120, and thus the body 100 may be formed through a relatively simple process compared to that of a unit device having a circular cross-section.

The molded portion 120 may be disposed to surround the capacitance formation portion Ac. More specifically, the molded portion 120 may be disposed on opposite cross-sections of the capacity forming portion Ac opposing each other the second direction and opposite cross-sections of the capacity forming portion Ac opposing each other in the third direction. That is, the molded portion 120 may cover a side surface of the capacitor forming portion Ac. The molded portion 120 may serve to protect the capacitor component 1000 from external impacts, foreign substances, or the like.

The molded portion 120 may include a thermoplastic resin such as a polystyrene resin, a vinyl acetate resin, a polyester resin, a polyethylene resin, a polypropylene resin, a polyamide resin, a rubber resin, an acrylic resin, or the like, a thermosetting resin such as a phenolic resin, an epoxy resin, a urethane resin, a melamine resin, an alkyd resin, or the like, a photosensitive resin, parylene, SiOx, or SiNx.

The molded portion 120 may be formed by, for example, applying a liquid insulating resin, stacking an insulating film, or performing a vapor deposition process. As the insulating film, a dry film (DF) including a photosensitive insulating resin, an Ajinomoto build-up film (ABF) not including a photosensitive insulating resin, or a polyimide film may be used.

The external electrodes 200 and 300 may be disposed on the first and second surfaces 1 and 2 of the body 100 to extend to a portion of each of the third to sixth surfaces 3, 4, 5, and 6. The external electrode 200 may include the first external electrode 200 and the second external electrode 300 respectively connected to the plurality of first internal electrodes 111 and the plurality of second internal electrodes 113.

The external electrodes 200 and 300 may be formed of any material as long as it has electrical conductivity, such as a metal, and a specific material may be determined in consideration of electrical characteristics, structural stability, and the like. Further, the external electrodes 200 and 300 may have a multilayer structure.

The external electrodes 200 and 300 may include, for example, first electrode layers 210 and 310 and second electrode layers 220 and 320 sequentially formed from the first and second surfaces 1 and 2 of the body 100.

The first electrode layers 210 and 310 may be formed by, for example, dipping the first and second surfaces 1 and 2 of the body 100 in a conductive paste for an external electrode including a conductive metal and glass, and then sintering the conductive paste. Alternatively, the first electrode layers 210 and 310 may be formed by transferring a sheet including a conductive metal and glass. Accordingly, the external electrodes 200 and 300 may be sintered electrodes including a conductive metal and glass.

Alternatively, the first electrode layers 210 and 310 may be, for example, a resin-based electrode including a conductive metal and a resin. The first electrode layers 210 and 310 may be formed by applying and curing a paste including a conductive metal and a resin.

The conductive metal included in the first electrode layers 210 and 310 may include, for example, copper (Cu), nickel (Ni), palladium (Pd), platinum (Pt), gold (Au), silver (Ag), lead (Pb), and/or an alloy including the same, preferably copper (Cu) and/or nickel (Ni), but is not limited thereto.

The second electrode layers 220 and 320 may improve mounting characteristics. A type of the second electrode layers 220 and 320 is not particularly limited, and may be a plating layer including nickel (Ni), tin (Sn), palladium (Pd) and/or an alloy including the same, and may be formed of a plurality of layers. The second electrode layers 220 and 320 may be, for example, a nickel (Ni) plating layer or a tin (Sn) plating layer, or may have a shape of the nickel (Ni) plating layer and the tin (Sn) plating layer being sequentially formed. In addition, the second electrode layers 220 and 320 may include a plurality of nickel (Ni) plating layers and/or a plurality of tin (Sn) plating layers.

In an example embodiment, the first internal electrode 111 may protrude toward the first surface 1 of the body 100, and the second internal electrode 113 may protrude toward the second surface 2 of the body 100.

The plurality of first internal electrodes 111 may protrude toward the first surface 1 to be connected to the first external electrode 200, and the plurality of second internal electrodes 113 may protrude toward the second surface 2 to be connected to the second external electrode 300, and thus a contact area between the internal electrodes 111 and 113 and the external electrodes 200 and 300 may be increased, thereby improving connectivity between the internal electrodes 111 and 113 and the external electrodes 200 and 300.

After a unit device 110 is formed by forming the first dielectric film 112 and the second internal electrode 113 on a side surface of the first internal electrode 111, the first dielectric film 112 and the second internal electrode 113 may be selectively removed by etching one end among the first and second ends of the unit device 110 opposing each other in the first direction, thereby allowing the first internal electrode 111 to protrude. In the same viewpoint, the first dielectric film 112 and the first internal electrode 111 may be selectively removed by etching the other end of the unit device 110, thereby allowing the second internal electrode 113 to protrude. However, the present disclosure is not limited thereto.

The first internal electrode 111, the first dielectric film 112, and the second internal electrode 113 may be selectively removed by different etching solutions, respectively, and accordingly the first internal electrode 111 and the second internal electrode 113 may preferably include different metals. For example, the first internal electrode 111 and the second internal electrode 113 may include different metals selected from a group consisting of copper (Cu), aluminum (Al), nickel (Ni), lead (Pb), cobalt (Co), tungsten (W), molybdenum (Mo), silver (Ag), and gold (Au).

However, the present disclosure is not limited thereto, and one end of the first internal electrode 111 may be selectively removed before the second internal electrode 113 is formed on a portion of the side surface of first dielectric film 112, and then the second internal electrode 113 may be formed on the first dielectric film 112, thereby forming the first internal electrode 111 to protrude from the one end of the unit device 110, and forming the second internal electrode 113 to protrude from the other end of the unit device 110. In this case, the first internal electrode 111 and the second internal electrode 113 may include the same metal.

In an example embodiment, the capacitor component 1000 may further include a first insulating film 400 disposed on the first surface 1 of the body 100, the first insulating film 400 covering the second internal electrode 113, and a second insulating film 500 disposed on the second surface 2 of the body 100, the second insulating film 500 covering the first internal electrode 111.

The capacitor component 1000 may include the insulating films 400 and 500, thereby not only improving mechanical durability of the capacitor component 1000 but also improving electrical insulation characteristics between the first external electrode 200 and the second internal electrode 113, and electrical insulation characteristics between the second external electrode 300 and the first internal electrode 111.

The insulating films 400 and 500 may include a material having electrical insulating properties, and the material is not particularly limited. For example, the insulating films 400 and 500 may include at least one of a resin and a ceramic. The resin may include, for example, a thermoplastic resin, a thermosetting resin, and/or a photosensitive resin, but the present disclosure is not limited thereto. The ceramic may include, for example, at least one oxide selected from tantalum (Ta), titanium (Ti), lanthanum (La), zirconium (Zr), barium (Ba), silicon (Si), and hafnium (Hf), but the present disclosure is not limited thereto.

The insulating films 400 and 500 may be formed by applying a liquid insulating resin or by a vapor deposition process such as an ALD process, a CVD process, or the like, but the present disclosure is not limited thereto.

Figure 7:
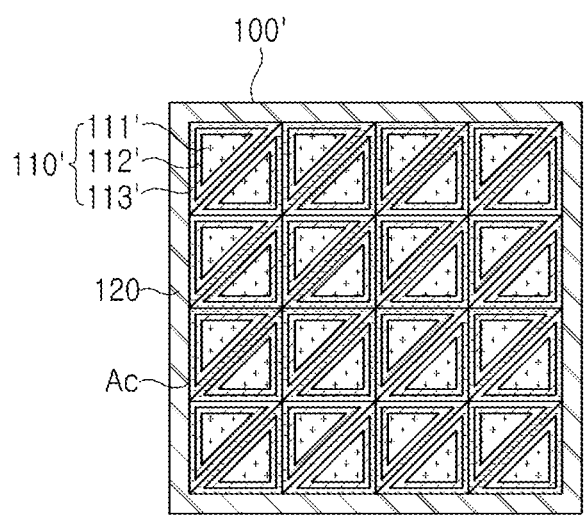
FIG. 7, a modification of FIG. 6, is a cross-sectional view illustrating an example embodiment in which a unit device has a triangular cross-section.

FIG. 7, a modification of FIG. 6, is a cross-sectional view illustrating an example embodiment in which a unit device has a triangular cross-section.

In case that an overall shape of the body is a rectangular parallelepiped, a packing density of a plurality of unit devices disposed in the body may be improved when cross-sections perpendicular to the first direction of the unit devices have a rectangular shape or a triangle shape, and accordingly, it may be advantageous for miniaturization and high capacitance.

That is, as illustrated in FIG. 7, in an example embodiment of the present disclosure, cross-sections perpendicular to the first direction of at least two of a plurality of unit devices 110' may have a triangular shape. In this case, a cross-section perpendicular to the first direction of a first internal electrode 111' may have a triangular shape, and cross-sections perpendicular to the first direction of the first dielectric film 112' and the second internal electrode 113' may have a triangular ring shape. Cross-sections perpendicular to the first direction of the unit devices 110' may be sufficient as long as they have a triangular shape, and may have, for example, a shape of an equilateral triangle, a right-angled triangle, or an isosceles triangle.

When the cross-sections perpendicular to the first direction of the plurality of unit devices 110' have a triangular shape, a cross-section perpendicular to the first direction formed by two unit devices 110' adjacent to each other may have a quadrangular shape. That is, one of the two adjacent unit devices may have a triangular cross-section perpendicular to the first direction, and the other may have an inverted triangular cross-section perpendicular to the first direction, thereby increasing a packing density of the unit devices 110' disposed in a body 100', and being advantageous for miniaturization and high capacitance of a capacitor component.

Hereinafter, other example embodiments of the present disclosure are described based on an example embodiment in which a cross-section perpendicular to the first direction of a unit device has a quadrangular shape, but the present disclosure is not limited thereto. The principle of the present disclosure may be applied in the same manner even when the cross-section perpendicular to the first direction of the unit device has a different polygonal shape.

Figure 8:
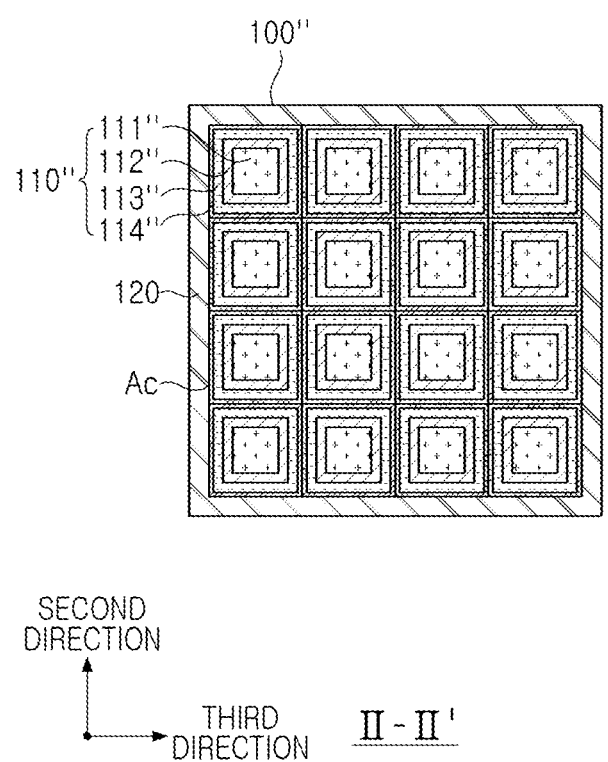
FIG. 8, a modification of FIG. 6, is a cross-sectional view illustrating an example embodiment in which a second dielectric film is further included.

FIG. 8, a modification of FIG. 6, is a cross-sectional view illustrating an example embodiment in which a second dielectric film is further included.

Referring to FIG. 8, in an example embodiment, a plurality of unit devices 110" may further include a second dielectric film 114" surrounding a second internal electrode 113". A capacitor component further including the second dielectric film 114" may further effectively protect a first internal electrode 111", a first dielectric film 112", and the second internal electrode 113" from the outside. In addition, insulation and reliability of the unit devices 110" may be further improved.

In addition, in order to improve capacitance per unit volume of a capacitor component, the first internal electrode 111", the first dielectric film 112", and the second internal electrode 113" sequentially formed on the second dielectric film 114" may be further included, and a plurality of first internal electrodes 111", a plurality of first dielectric films 112", a plurality of second internal electrodes 113", and a plurality of second dielectric films 114" may be included.

The second dielectric film 114" may be formed of the same material as that of the first dielectric film 112", but the present disclosure is not limited thereto. Depending on the purpose, the second dielectric film 114" may be formed of a different material from that of the first dielectric film 112".

Figure 9:
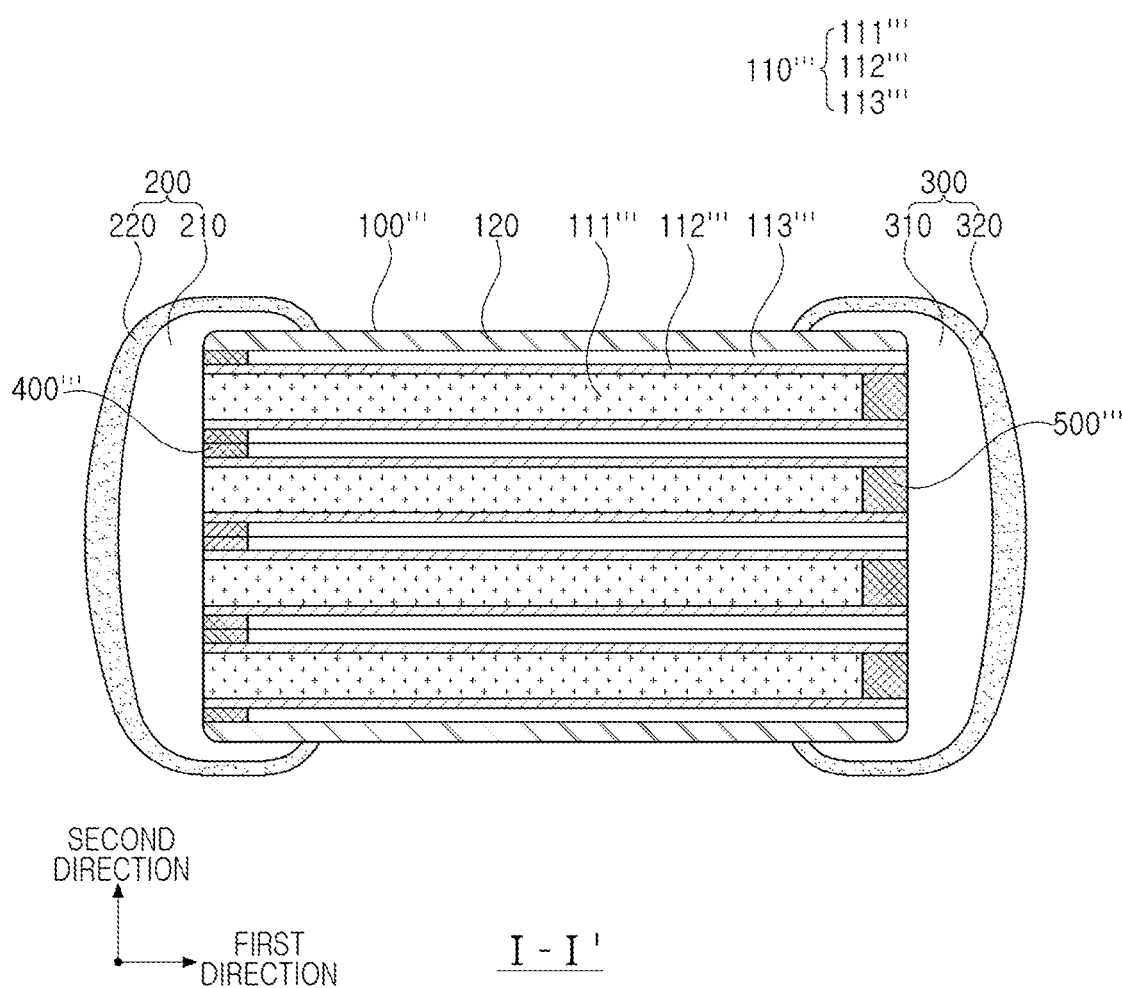
FIG. 9, a modification of FIG. 5, is a cross-sectional view illustrating another example embodiment of the present disclosure.

FIG. 9, a modification of FIG. 5, is a cross-sectional view illustrating another example embodiment of the present disclosure.

Referring to FIG. 9, in an example embodiment, a first internal electrode 111''' may be connected to a first surface 1 of a body 100''', and may be disposed to be spaced apart from a surface 2 of the body 100'''. A second internal electrode 113''' may be connected to the second surface 2 of the body 100''', and may be disposed to be spaced apart from the first surface 1 of the body 100'''.

After a unit device 110''' is formed by forming the first dielectric film 112''' and the second internal electrode 113''' on a side surface of the first internal electrode 111''', the second internal electrode 113''' may be selectively removed by etching one end among the one end and the other end opposing each other in the first direction of the unit device 110''', and thus the second internal electrode 113''' may be disposed to be spaced apart from the first surface 1 of the body 100'''. In the same viewpoint, the first internal electrode 111''' may be selectively removed by etching the other end of the unit device 110''', and thus the first internal electrode 111''' may be disposed to be spaced apart from the second surface 2 of the body 100'''.

A capacitor component according to an example embodiment may selectively remove only the first and second internal electrodes 111''' and 113''' from one end and the other end of the unit device 110''', respectively, thereby connecting, through a simpler process, the first and second internal electrodes 111''' and 113''' to the first and second external electrodes 200 and 300, respectively.

In an example embodiment, the capacitor component may further include a first insulating film 400''' disposed in a space between the first surface 1 of the body 100''' and the second internal electrode 113''', the first insulating film 400''' covering one end of the second electrode 113''', and a second insulating film 500''' disposed in a space between the second surface 2 of the body 100''' and the first internal electrode 111''', the second insulating film 500''' covering one end of the first internal electrode 111'''.

The capacitor component including the insulating films 400''' and 500''' may not only improve mechanical durability of the capacitor component but also improve electrical insulation characteristics between the first external electrode 200 and the second internal electrode 113''', and electrical insulation characteristics between the second external electrode 300 and the first internal electrode 111'''.

Figure 10:
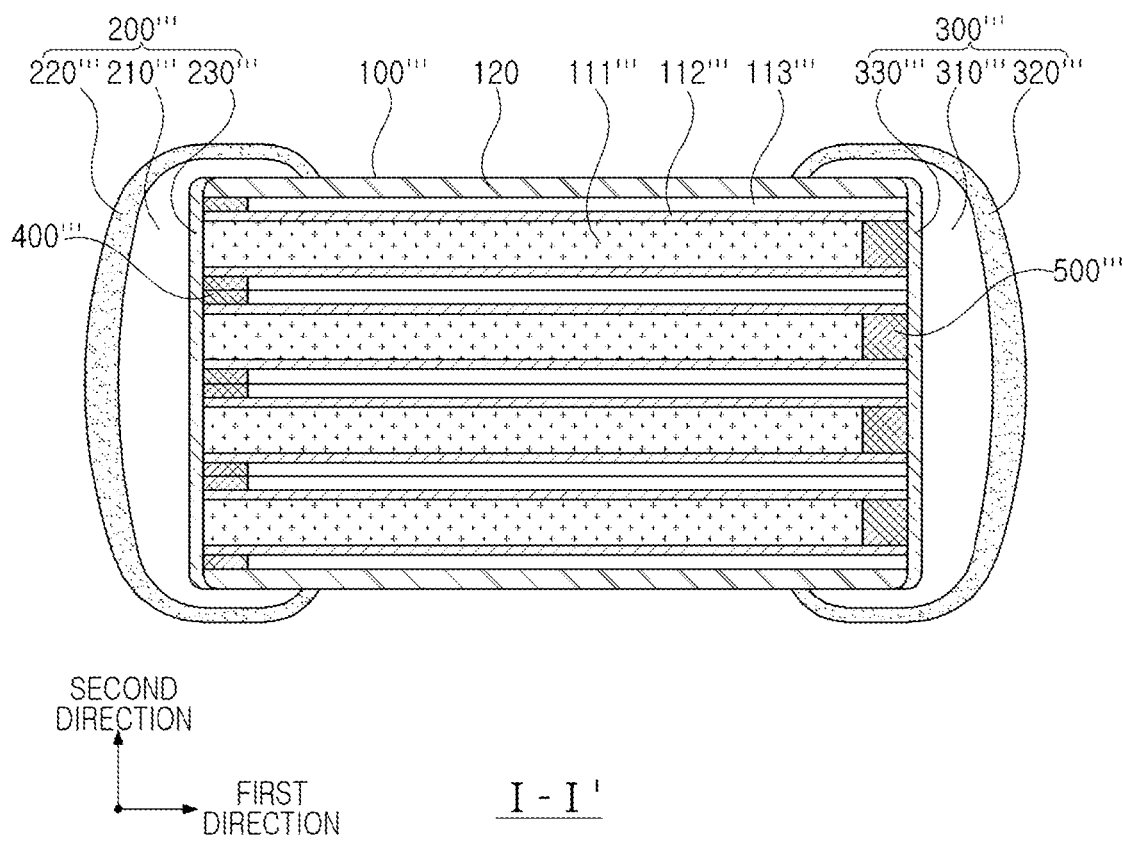
FIG. 10, a modification of FIG. 9, is a cross-sectional view illustrating an example embodiment in which a connection electrode layer is further included.

FIG. 10, a modification of FIG. 9, is a cross-sectional view illustrating an example embodiment in which a connection electrode layer is further included.

Referring to FIG. 10, in an example embodiment, a capacitor component may include external electrodes 200''' and 300''' formed on the outside of the body 100''', and the external electrodes 200''' and 300''' may include connection electrode layers 230''' and 330''' disposed on the first and second surfaces 1 and 2 of the body 100'''.

In this case, the connection electrode layers 230''' and 330''' may be a plating layer or sputtering layer. The first and second internal electrodes 111 and 113 of the capacitor component according to an example embodiment may not protrude toward the first and second surfaces 1 and 2 of the body 100''', and thus the plating layer or sputtering layer may be uniformly formed on the first surface 1 and the second surface 2 of body 100''', thereby securing electrical connectivity between the first and second internal electrodes 111 and 113 and the first and second external electrodes 200''' and 300'''.

The connection electrode layers 230''' and 330''' may include, for example, one or more of nickel (Ni), copper (Cu), gold (Au), chromium (Cr), and an alloy thereof, and thus the connection electrode layers 230''' and 330''' may be formed through a known plating process and sputtering process.

The external electrodes 200''' and 300''' may include first electrode layers 210''' and 310''' formed on the connection electrode layers 230''' and 330''', and second electrode layers 220''' and 320''' formed on the first electrode layers 210''' and 310'''. A description overlapping those of the above-described first electrode layers 210 and 310 and the second electrode layers 220 and 320 is omitted.

Figure 11:
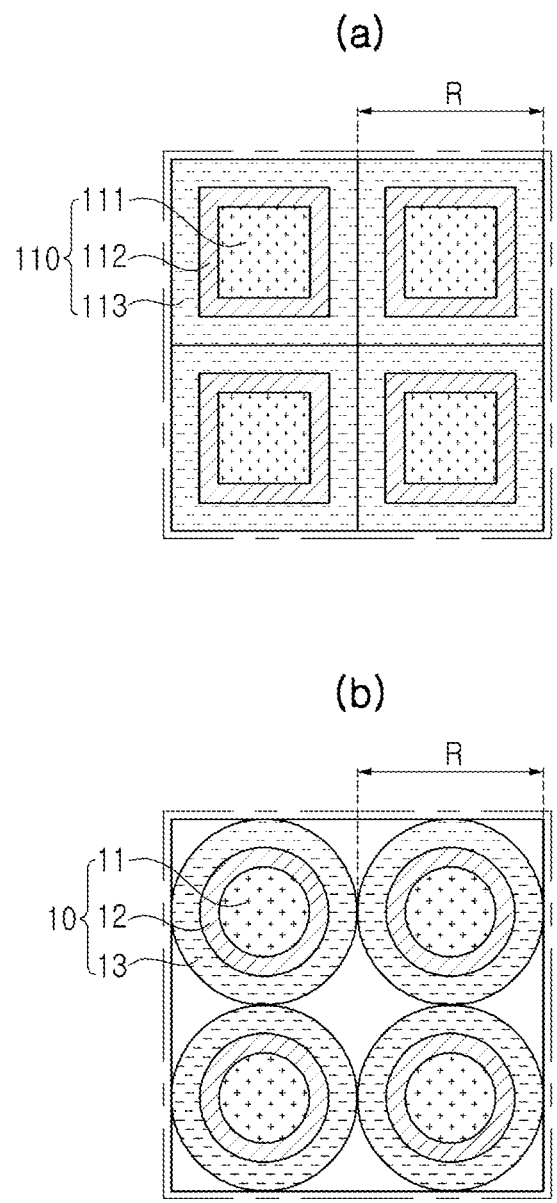
FIG. 11 is a cross-sectional view illustrating a unit device of each of an inventive example and a comparative example.

FIG. 11 is a cross-sectional view illustrating a unit device of each of Inventive Example (a) and Comparative Example (b).

Referring to FIG. 11, when a diameter R of the unit device 110 of an invention example and a diameter of the unit device 10 of a comparative example are the same, it can be seen that a ratio of an area occupied by a unit device within the same area may be higher in the inventive example in which the unit device 110 has a polygonal cross-section than that in the comparative example in which the unit device 110 has a circular cross-section.

Figure 12:
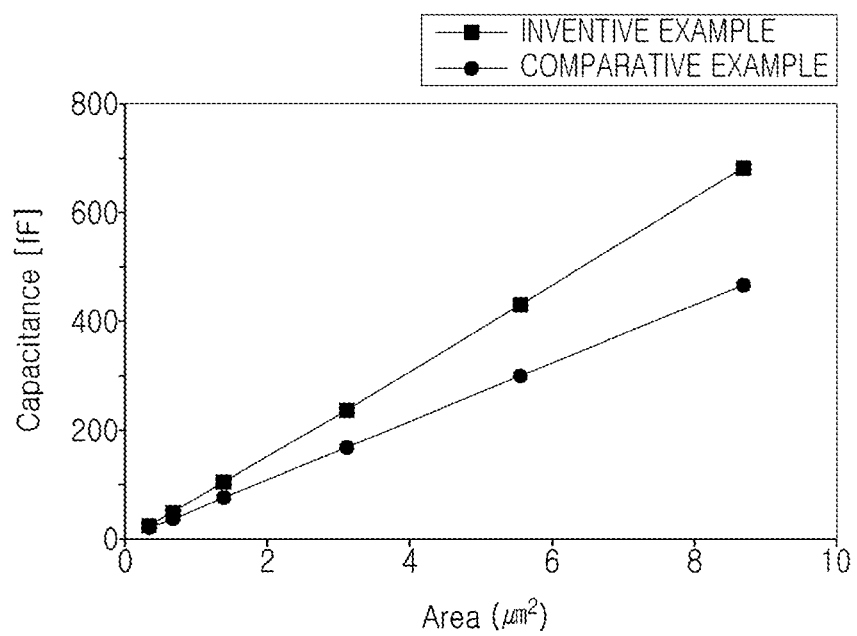
FIG. 12 is a graph illustrating capacitance according to an area of a unit device of each of an inventive example and a comparative example.

FIG. 12 is a graph illustrating capacitance according to an area of a unit device of each of an inventive example and a comparative example. More specifically, the graph illustrates a comparison between capacitances of the invention example and capacitances of the comparative example when a size of the first internal electrode 111 in a second direction and a size of the first internal electrode 111 in a third direction of the inventive example are 0.5 µm, respectively, a size of a first internal electrode 11 in the second direction and a size of the first internal electrode 11 in the third direction of the comparative example are 0.5 µm, respectively, a thickness of the first dielectric film 112 and a thickness of the second internal electrode 113 of the inventive example are 0.01 µm, respectively, and a thickness of a first dielectric film 12 and a thickness of a second internal electrode 13 of the comparative example is 0.01 µm, respectively.

In addition, when the number of the unit devices 110 of the invention example and the number of the unit devices 10 of the comparative example having the same diameter R are 1×1, 2×2, 3×3, 4×4, and 5×5, respectively, capacitances of the invention example and the comparative example were measured, respectively.

In a cross-section perpendicular to the first direction, it can be seen that a surface length (a perimeter of a quadrilateral or a circle) of a first dielectric film that determines capacitance is about 27% higher in the inventive example than that in the comparative example. Accordingly, as illustrated in FIG. 12, it can be seen that capacitance per unit volume is about 27% higher in the inventive example than that of the comparative example.

In addition, in the cross-section perpendicular to the first direction, it can be seen that a sum of areas of a first internal electrode and a second internal electrode is about 27% higher in the inventive example than that in the comparative example. Accordingly, it can be seen that an ESR of the inventive example is about 27% lower than that in the comparative example.

While example embodiments have been shown and described above, it will be apparent to those skilled in the art that modifications and variations could be made without departing from the scope of the present invention as defined by the appended claims.

In addition, the term "an example embodiment" does not refer to the same example embodiment, and describe different unique features of various example embodiments. However, the above-suggested example embodiments may also be implemented to be combined with a feature of another example embodiment. For example, even when a content described with respect to an example embodiment is not described in another example embodiment, it may be understood as a description related to the other example embodiment unless described to the contrary or contradictory in the other example embodiment.

What is claimed is:
1. A capacitor component comprising:
a body including a capacitance formation portion and a molded portion surrounding the capacitance formation portion, the capacitance formation portion comprising a plurality of unit devices including a first internal electrode, a first dielectric film surrounding the first internal electrode, and a second internal electrode surrounding the first dielectric film;

first and second external electrodes respectively disposed on a first surface and a second surface of the body opposing each other in a first direction to be respectively connected to the first and second internal electrodes;

a first insulating film covering one end of the second internal electrode; and a second insulating film covering one end of the first internal electrode, wherein cross-sections perpendicular to the first direction of at least two of the plurality of unit devices have a polygonal shape.

2. The capacitor component of claim 1, wherein the at least two of the plurality of unit devices are disposed to be in surface contact with each other.

3. The capacitor component of claim 1, wherein unit devices adjacent to each other among the plurality of unit devices are disposed to be in surface contact with each other in a second direction and a third direction perpendicular to the first direction.

4. The capacitor component of claim 1, wherein the polygonal shape is a quadrangular shape.

5. The capacitor component of claim 1, wherein the polygonal shape is a triangular shape.

6. The capacitor component of claim 5, wherein a cross-section perpendicular to the first direction formed by two unit devices adjacent to each other among the plurality of unit devices has a quadrangular shape.

7. The capacitor component of claim 1, wherein
in a unit device, among the plurality of unit devices, having a polygonal cross-section perpendicular to the first direction,
a cross-section perpendicular to the first direction of the first internal electrode has a polygonal shape, and
a cross-section perpendicular to the first direction of the second internal electrode has a polygonal ring shape.

8. The capacitor component of claim 1, wherein
the first internal electrode protrudes toward the first surface of the body relative to the first dielectric film and the second internal electrode, and
the second internal electrode protrudes toward the second surface of the body relative to the first internal electrode and the first dielectric film.

9. The capacitor component of claim 1,
wherein the first insulating film is disposed on the first surface of the body and contacts the second internal electrode, and
wherein the second insulating film is disposed on the second surface of the body and contacts the first internal electrode.

10. The capacitor component of claim 1, wherein the plurality of unit devices further includes a second dielectric film surrounding the second internal electrode.

11. The capacitor component of claim 1, wherein
the first internal electrode is connected to the first surface of the body, and is disposed to be spaced apart from the second surface of the body, and the second internal electrode is connected to the second surface of the body, and is disposed to be spaced apart from the first surface of the body.

12. The capacitor component of claim 11,
wherein the first insulating film is disposed in a space between the first surface of the body and the second internal electrode, and
wherein the second insulating film is disposed in a space between the second surface of the body and the first internal electrode.

13. The capacitor component of claim 11, further comprising:
the first and second external electrodes further include a connection electrode layer disposed respectively on the first and second surfaces of the body,
wherein the connection electrode layer is a plating layer or a sputtering layer.

14. The capacitor component of claim 1, wherein the first and second internal electrodes include different metals.

15. The capacitor component of claim 14, wherein the first and second internal electrodes include different metals selected from a group consisting of copper (Cu), aluminum (Al), nickel (Ni), lead (Pb), cobalt (Co), tungsten (W), molybdenum (Mo), silver (Ag), and gold (Au).

16. A capacitor component comprising:
a body including a capacitance formation portion and a molded portion surrounding the capacitance formation portion, the capacitance formation portion comprising a plurality of unit devices including a first internal electrode, a first dielectric film surrounding the first internal electrode, and a second internal electrode surrounding the first dielectric film; and first and second external electrodes respectively disposed on a first surface and a second surface of the body opposing each other in a first direction to be respectively connected to the first and second internal electrodes, wherein cross-sections perpendicular to the first direction of at least two of the plurality of unit devices have a polygonal shape, and wherein the plurality of unit devices further includes a second dielectric film surrounding the second internal electrode.

17. The capacitor component of claim 16, wherein the at least two of the plurality of unit devices are disposed to be in surface contact with each other.

18. The capacitor component of claim 16, wherein unit devices adjacent to each other among the plurality of unit devices are disposed to be in surface contact with each other in a second direction and a third direction perpendicular to the first direction.

19. The capacitor component of claim 16, wherein the polygonal shape is a quadrangular shape.

20. The capacitor component of claim 16, wherein the polygonal shape is a triangular shape.

* * * * *